No. 790,442. PATENTED MAY 23, 1905.
F. LEBER.
MUSICAL INSTRUMENT.
APPLICATION FILED SEPT. 8, 1904.

2 SHEETS—SHEET 1.

WITNESSES.
Albert Jones
Samuel Percival

INVENTOR
Franz Leber
By his Attorneys
Wheatley & MacKenzie

No. 790,442. PATENTED MAY 23, 1905.
F. LEBER.
MUSICAL INSTRUMENT.
APPLICATION FILED SEPT. 8, 1904.

WITNESSES.
Albert Jones
Samuel Percival

INVENTOR
Franz Leber
By his Attorneys
Wheatley & MacKenzie

No. 790,442. Patented May 23, 1905.

UNITED STATES PATENT OFFICE.

FRANZ LEBER, OF GREIZ, GERMANY.

MUSICAL INSTRUMENT.

SPECIFICATION forming part of Letters Patent No. 790,442, dated May 23, 1905.

Application filed September 8, 1904. Serial No. 223,742.

*To all whom it may concern:*

Be it known that I, FRANZ LEBER, a subject of the German Emperor, residing at 1 Wiesenstrasse, Greiz, Germany, have invented certain new and useful Improvements in Musical Instruments; and I do hereby declare the following to be a full, clear, and exact description of the invention, such as will enable others skilled in the art to which it appertains to make and use the same.

This invention relates to an instrument like a harmonium, chiefly intended for use in music and singing lessons and enabling the teacher even when the number of pupils is large to bring the subject of instruction simultaneously and continuously to the eyes and ears of all the pupils, so that the fundamental ideas of instruction in music and singing can be just as easily impressed in class teaching as has been possible hitherto with individual teaching.

In connection herewith it is recognized that the position of a note and the construction of the different scales are most easily understood if when a note is sounded the position of such note in relation to the other notes belonging to a scale is simultaneously indicated by means of the keyboard. With the means at present available such a method of instruction is only possible with individual teaching, but in class teaching the teacher is only able to avail himself of the scales.

In order that general—that is to say, class—teaching may be carried on in the same manner as individual teaching, the keyed instrument which forms the subject of this invention is so constructed that it can be suspended with the keys vertical and be played in that position, so that all the pupils are able to follow the remarks of the teacher, the teacher being further enabled when playing the instrument to keep the class in view.

Figure 1:
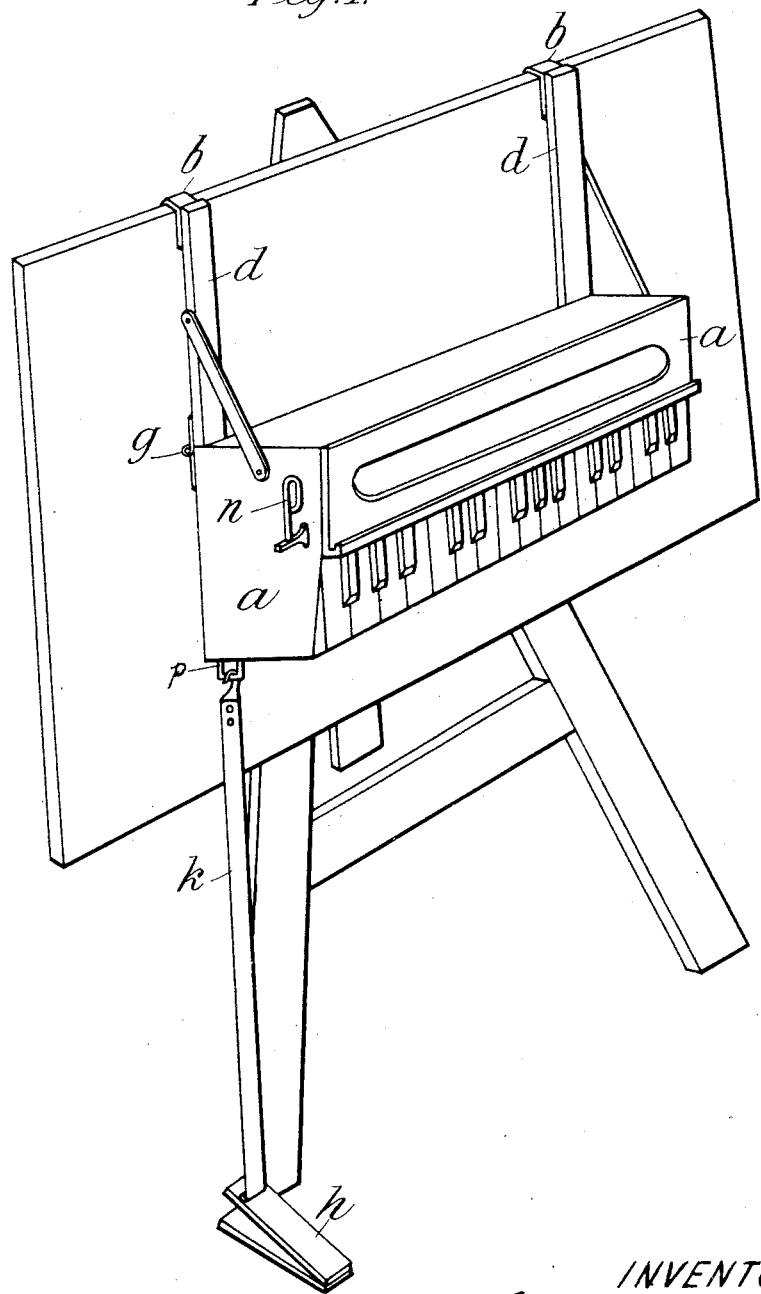
Figure 2:
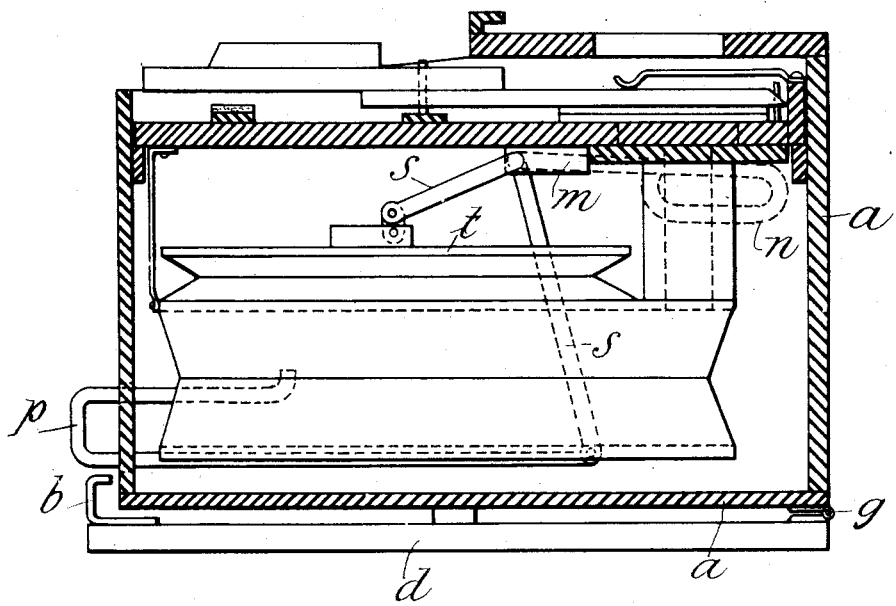

Figure 1 of the accompanying drawings is a diagram showing the instrument hung on a blackboard, and Fig. 2 is a transverse section of the instrument on a larger scale.

In the case $a$ the ordinary foot is replaced by suspension-hooks $b$, which, as shown in the drawings, are preferably attached to arms $d$, collapsibly supported on the casing $a$ by means of hinges $g$, so that the instrument can be hung on the blackboard in the class-room and the keys be conveniently reached. When the instrument is hung up, the foot-lever $h$ is connected through the strap $k$, which can be lengthened or shortened by means of a buckle, according to the height at which the blackboard is suspended, with the rod $p$, which engages with the angle-lever $s$, seated in the block $m$ and connected with the bellows $t$.

In order that it may be possible to play the instrument like any other harmonium, even when it is laid on the table, the rotary axis of the lever $s$ is connected outside the front of the casing with a lever-arm $n$. When the instrument is played in a horizontal position, the foot-lever $h$ is connected with the lever $n$.

If the suspended instrument be fitted with strings or wires which are struck, the levers $s$ and $n$ and the foot-lever $h$ are of course omitted.

In the support situated above the keyboard a sheet of music is arranged for the purpose of enabling the exercises with the keys to be immediately repeated with the notes.

What I claim, and desire to secure by Letters Patent, is—

1. A musical instrument for use in music and singing lessons, provided with a keyboard, and means for suspending the instrument with the keys vertical substantially as and for the purpose described.

2. A musical wind instrument provided with a keyboard, a bellows within the instrument, a pivoted angle-lever connected at one end to the bellows, means for detachably connecting a foot-lever or treadle with the angle-lever in such manner that the bellows can be actuated when the keyboard is in a vertical or horizontal position and means for suspending the instrument with the keys vertical substantially as described.

In testimony whereof I have affixed my signature in presence of two witnesses.

FRANZ LEBER.

Witnesses:
 FRITZ NUSTITZ,
 RUD SPARING.